(12) United States Patent
Chen et al.

(10) Patent No.: US 12,394,090 B2
(45) Date of Patent: Aug. 19, 2025

(54) EYEBALL LOCATING METHOD, IMAGE PROCESSING DEVICE, AND IMAGE PROCESSING SYSTEM

(71) Applicant: Industrial Technology Research Institute, Hsinchu (TW)

(72) Inventors: Jian-Lung Chen, Taoyuan (TW); Yu-Ju Chao, Hsinchu County (TW); Ting-Hsun Cheng, Chiayi County (TW); Yu-Hsin Lin, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 572 days.

(21) Appl. No.: 17/547,221

(22) Filed: Dec. 10, 2021

(65) Prior Publication Data

US 2023/0169790 A1   Jun. 1, 2023

(30) Foreign Application Priority Data

Nov. 30, 2021   (TW) .................................. 110144566

(51) Int. Cl.
*G06V 40/16*   (2022.01)
*G06T 5/00*   (2024.01)
*G06T 7/73*   (2017.01)

(52) U.S. Cl.
CPC .............. *G06V 40/161* (2022.01); *G06T 5/00* (2013.01); *G06T 7/75* (2017.01); *G06V 40/171* (2022.01)

(58) Field of Classification Search
None
See application file for complete search history.

(56) References Cited

U.S. PATENT DOCUMENTS 8,704,653 B2   4/2014 Seder et al.
11,227,157 B1 *   1/2022 Mathew ................. G06V 40/19

FOREIGN PATENT DOCUMENTS

| CN | 104766059 B | * | 3/2018 |
| CN | 109960975 | | 7/2019 |
| CN | 106575357 | | 4/2020 |

(Continued)

OTHER PUBLICATIONS

Li, Shuang, et al. "Multiâangle head pose classification with masks based on color texture analysis and stack generalization." Concurrency and Computation: Practice and Experience 35.18 (2021): e6331. (Year: 2021).*

(Continued)

*Primary Examiner* — Matthew C Bella
*Assistant Examiner* — Johnny B Duong
(74) *Attorney, Agent, or Firm* — JCIPRNET (57) ABSTRACT

An eyeball locating method, an image processing device, and an image processing system are proposed. The method includes the following steps. A human facial image of a user is obtained, wherein the human facial image includes an unobscured human facial region and an obscured human facial region, and the unobscured human facial region includes an eye region. At least one unobscured human facial feature is detected from the unobscured human facial region, and at least one obscured human facial feature is estimated from the obscured human facial region. Next, an eyeball position is located according to the unobscured human facial feature and the obscured human facial feature.

18 Claims, 6 Drawing Sheets

(56) References Cited

FOREIGN PATENT DOCUMENTS

| | | |
|---|---|---|
| CN | 111368717 | 7/2020 |
| CN | 112818901 | 5/2021 |
| CN | 113343885 | 9/2021 |
| CN | 113515977 | 10/2021 |
| JP | 5359266 B2 * | 12/2013 |
| TW | I549505 | 9/2016 |

OTHER PUBLICATIONS

Ahmed, Noha Younis. "Real-time accurate eye center localization for low-resolution grayscale images." Journal of Real-Time Image Processing 18.1 (2021): 193-220. (Year: 2021).*

Din, Nizam Ud, et al. "A novel GAN-based network for unmasking of masked face." IEEE Access 8 (2020): 44276-44287. (Year: 2020).*

Li, Shuang, et al. "Multi-angle head pose classification with masks based on color texture analysis and stack generalization." Concurrency and Computation: Practice and Experience 35.18 (2021): e6331. (Year: 2021).*

Alzu'bi, Ahmad, et al. "Masked face recognition using deep learning: A review." Electronics 10.21 (2021): 2666. (Year: 2021).*

Luo, Xiaodong, et al. "EyesGAN: Synthesize human face from human eyes." Neurocomputing 404 (2020): 213-226. (Year: 2020).*

He, Tengjiao. "Mask wearing detection method based on the skin color and eyes detection." Journal of Physics: Conference Series. vol. 1906. No. 1. IOP Publishing, 2021. (Year: 2021).*

Jian-Lung Chen, et al., "Adaptable Eye tracking Technology of Obscured Face", Proceedings of the International Display Workshops, vol. 27, 2020, pp. 637-640.

* cited by examiner

EYEBALL LOCATING METHOD, IMAGE PROCESSING DEVICE, AND IMAGE PROCESSING SYSTEM

CROSS-REFERENCE TO RELATED APPLICATION

This application claims the priority benefit of Taiwan application serial no. 110144566, filed on Nov. 30, 2021. The entirety of the above-mentioned patent application is hereby incorporated by reference herein and made a part of this specification.

TECHNICAL FIELD

The disclosure relates to an eyeball locating technique.

BACKGROUND

During the coronavirus pandemic or seasonal flu, people wear masks to reduce the risk of infection. However, human facial recognition is not able to achieve the recognition effect due to the obscured features of the human face. As a result, precise eyeball locating may not be achieved.

SUMMARY

The disclosure provides an eyeball locating method, an image processing device, and an image processing system.

In an exemplary embodiment of the disclosure, the method includes the following steps. A human facial image of a user is obtained, wherein the human facial image includes an unobscured human facial region and an obscured human facial region, and the unobscured human facial region includes an eye region. At least one unobscured human facial feature is detected from the unobscured human facial region, and at least one obscured human facial feature is estimated from the obscured human facial region. Next, a position of an eyeball is located according to the unobscured human facial feature and the obscured human facial feature.

In an exemplary embodiment of the disclosure, the image processing device includes a memory and a processor, wherein the processor is connected to the memory. The memory is configured to store a data. The processor is configured to: obtain a human facial image of a user, wherein the human facial image includes an unobscured human facial region and an obscured human facial region, and the unobscured human facial region includes an eye region; detect at least one unobscured human facial feature from the unobscured human facial region; estimate at least one obscured human facial feature from the obscured human facial region; and locate an eyeball position according to the unobscured human facial feature and the obscured human facial feature.

In an exemplary embodiment of the disclosure, the image processing system includes an image capture device and an image processing device, wherein the image processing device is connected to the image capture device. The image capture device is configured to capture a human facial image of a user, wherein the human facial image includes an unobscured human facial region and an obscured human facial region, and the unobscured human facial region includes an eye region. The image processing device is configured to: obtain a human facial image from the image capture device; detect at least one unobscured human facial feature from the unobscured human facial region; estimate at least one obscured human facial feature from the obscured human facial region; and locate an eyeball position according to the unobscured human facial feature and the obscured human facial feature.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

A portion of the exemplary embodiments of the disclosure is described in detail hereinafter with reference to figures. In the following, the same reference numerals in different figures should be considered to represent the same or similar elements. These exemplary embodiments are a portion of the disclosure and do not disclose all of the possible implementations of the disclosure. To be more precise, these exemplary embodiments are examples of methods, devices, and systems within the scope of the claims of the disclosure.

Figure 1:
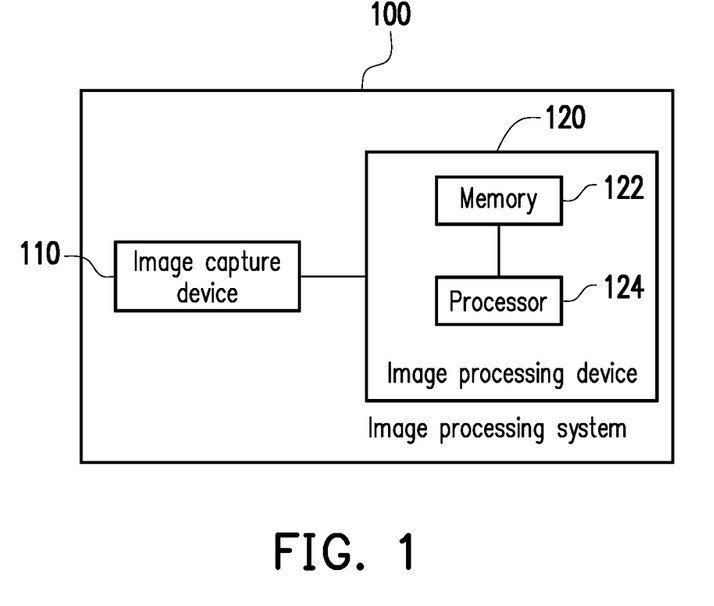
FIG. 1 is a schematic diagram of an image processing system shown according to an exemplary embodiment of the disclosure.

FIG. 1 is a schematic diagram of an image processing system shown according to an exemplary embodiment of the disclosure. First, FIG. 1 first introduces the various components and configuration relationships in the system. The detailed functions are disclosed together with the flowcharts of the subsequent exemplary embodiments.

Please refer to FIG. 1, an image processing system 100 in the present exemplary embodiment includes an image capture device 110 and an image processing device 120. The image capture device 110 may be, for example, a digital camera, a digital recorder, a web recorder, a surveillance recorder, etc. The image processing device 120 may be, for example, a personal computer, a notebook computer, a server computer, a tablet computer, a smart phone, a workstation, or other computer systems or platforms that may be connected to the image capture device 110 in a wireless or wired manner via a communication interface, wherein the communication interface may be a transmission interface supporting any wired connection or wireless communication standard for data transmission with other devices. In another exemplary embodiment, the image processing system 100 may be an electronic device having image capture function and image processing function integrating members into a single electronic device, such as a smart phone, a tablet computer, a notebook computer, etc. In another exemplary embodiment, the image processing device 120 may be an embedded system built in the image capture device 110, and the disclosure is not limited in this regard.

The image capture device 110 is configured to capture an image and includes a camera lens having a lens and a photosensitive element. The photosensitive element is used to sense the intensity of light entering the lens to produce an image. The photosensitive element may be, for example, a charge-coupled device (CCD), a complementary metal-oxide semiconductor (CMOS) device, or other devices.

The image processing device 120 includes a memory 122 and a processor 124. The memory 122 is configured to store data such as an image or a program code, and may be, for example, any type of fixed or removable random-access memory (RAM), read-only memory (ROM), flash memory, hard disk or other similar devices, an integrated circuit, and a combination thereof. The processor 124 is configured to control the actions between the members of the image processing system 100, and may be, for example, a central processing unit (CPU), an application processor (AP), or a programmable general-purpose or special-purpose microprocessor, digital signal processor (DSP), image signal processor (ISP), graphics processing unit (GPU), or other similar devices, integrated circuits, and combinations thereof.

Figure 2:
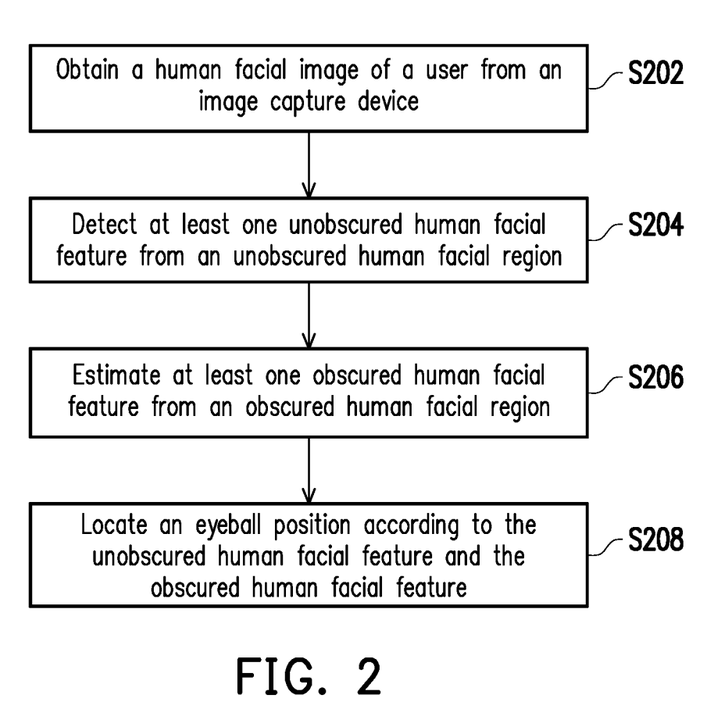
FIG. 2 is a flowchart of an eyeball locating method shown according to an exemplary embodiment of the disclosure.

FIG. 2 is a flowchart of an eye locating method shown according to an exemplary embodiment of the disclosure, and the method flow of FIG. 2 may be implemented by the image processing system 100 of FIG. 1. The following process is explained by a user wearing a mask, but the disclosure is not limited thereto. In other embodiments, the eyeball locating may also be performed for a user wearing sun-shading equipment or protective equipment such as a mask, a safety helmet, or a headgear. In other words, under the premise that an eyeball of the user is not obscured, the following method procedures may be adopted.

Referring to FIG. 1 and FIG. 2 at the same time, the processor 124 of the image processing device 120 of the image processing system 100 obtains the human facial image of the user from the image capture device 110 (step S202). The human facial image here includes a human facial region covered by a mask (hereinafter referred to as the "obscured human facial region") and a human facial region not obscured by a mask (hereinafter referred to as the "unobscured human facial region"), wherein the unobscured human facial region includes the eye region of the user.

Then, the processor 124 of the image processing device 120 detects at least one unobscured human facial feature from the unobscured human facial region (step S204), and estimates at least one obscured human facial feature from the obscured human facial region (step S206). The unobscured human facial feature here may be recognized by a method of general facial feature detection, and the obscured human facial feature obscured by the mask needs to be estimated via feature restoration or feature estimation.

Then, the processor 124 of the image processing device 120 locates the eyeball position according to the unobscured human facial feature and the obscured human facial feature (step S208). In other words, the processor 124 may determine the eyeball position using the detected unobscured human facial feature and the estimated obscured human facial feature, thereby calculating the eyeball center to achieve precise locating.

For ease of understanding, the following exemplary embodiments describe the details of the flow of FIG. 2 in conjunction with different application scenarios of the image processing system 100. In the following exemplary embodiments, the description is also provided based on a user wearing a mask, but the disclosure is not limited thereto.

Figure 3:
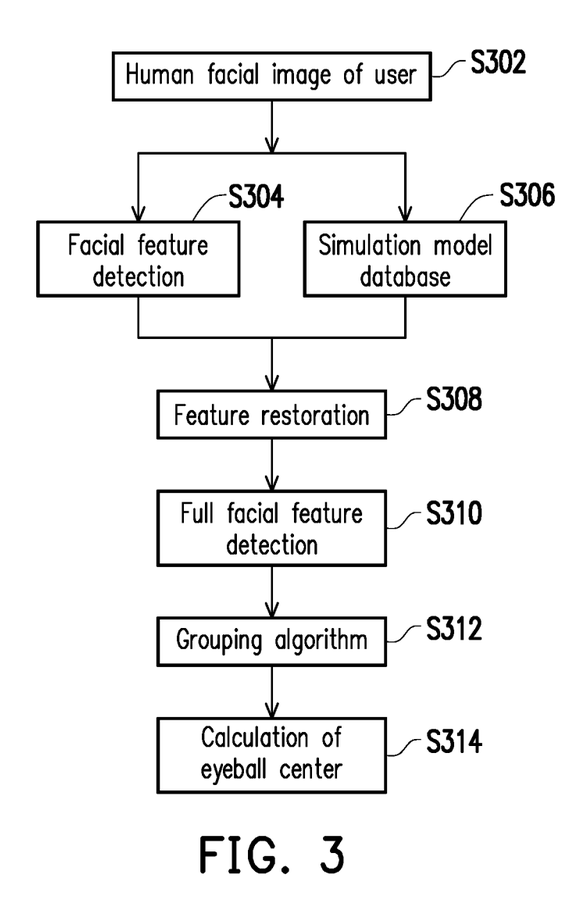
FIG. 3 is a flowchart of an eyeball locating method shown according to an exemplary embodiment of the disclosure.

FIG. 3 is a flowchart of an eyeball locating method shown according to an exemplary embodiment of the disclosure. It should be mentioned that, before entering this process, the memory 122 of the image processing device 120 pre-stored a face detection model to assist subsequent facial feature detection. The face detection model here uses a large number of human facial images (for example, 5000), and performs machine learning training using a facial feature detection algorithm, and the human facial images include an unobscured human facial image and an obscured human facial image shot from different angles. In addition, the memory 122 of the image processing device 120 may store a pre-established simulation model database configured to restore the obscured human facial feature, and the details thereof are described later.

Referring to FIG. 1 and FIG. 3 at the same time, the processor 124 of the image processing device 120 of the image processing system 100 obtains a human facial image of a user captured by the image capture device 110 (step S302). Next, the processor 124 performs human facial feature detection on the human facial image using a trained face detection model (step S304), thereby detecting information of an unobscured human facial feature from an unobscured human facial region in the human facial image.

In addition, the processor 124 may select the most suitable simulation model from the simulation model database based on a head orientation angle of the user in the human facial image (step S306). Then, the processor 124 performs feature restoration according to the unobscured human facial feature (step S308), so as to restore an obscured human facial region to facilitate subsequent full facial feature detection (step S310).

Figure 4:
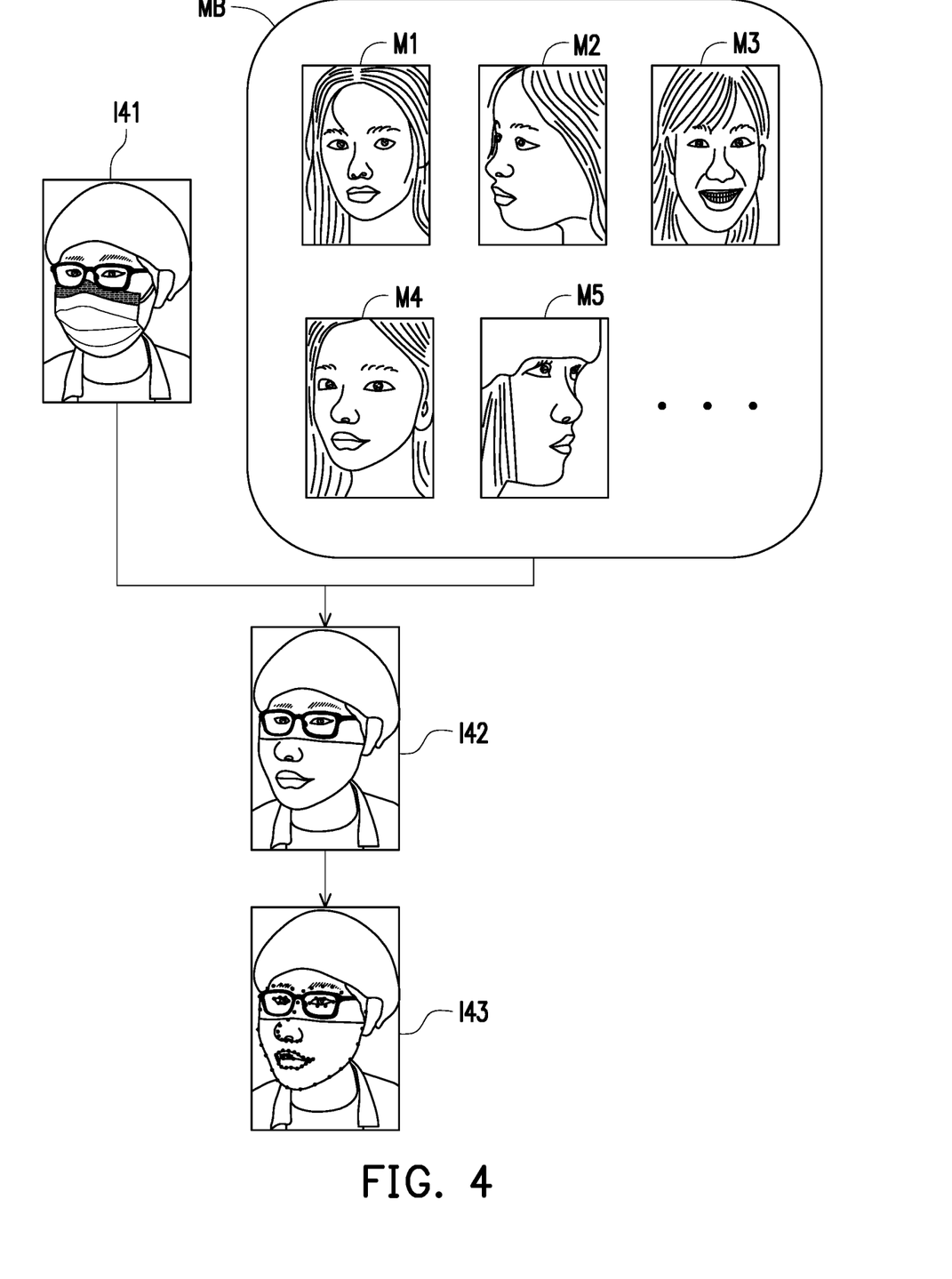
FIG. 4 is a functional flowchart of human facial feature restoration shown according to an exemplary embodiment of the disclosure.

FIG. 4 is a functional flowchart of human facial feature restoration shown according to an exemplary embodiment of the disclosure.

Please refer to FIG. 1 and FIG. 4 at the same time. Here, in a human facial image I41 obtained by the processor 124, the head orientation angle of the user is "20 degrees to the left". Moreover, a simulation model database MB stores a plurality of simulation models based on a plurality of human facial images of different skin colors and face shapes and having a plurality of different head orientation angles. For example, a simulation model M1 is "10 degrees to the left", a simulation model M2 is "40 degrees to the left", a simulation model M3 is "0 degrees to the front", a simulation model M4 is "25 degrees to the left", and a simulation model M5 is "40 degrees to the right". The processor 124 may determine that the head orientation angle of the simulation model M4 is closest to the head orientation angle of the human facial image I41. Therefore, the processor 124 restores the obscured human facial region of the human facial image I41 according to the simulation model M4 to generate a restored image I42. Then, the processor 124 may perform full facial feature detection on the restored image I42 using any facial feature detection algorithm to obtain an unobscured human facial feature and an obscured human facial feature, as shown in an image I43. From another point of view, the unobscured human facial feature comes from the human facial image I41, and the obscured human facial feature comes from the restored image I42.

Figure 5:
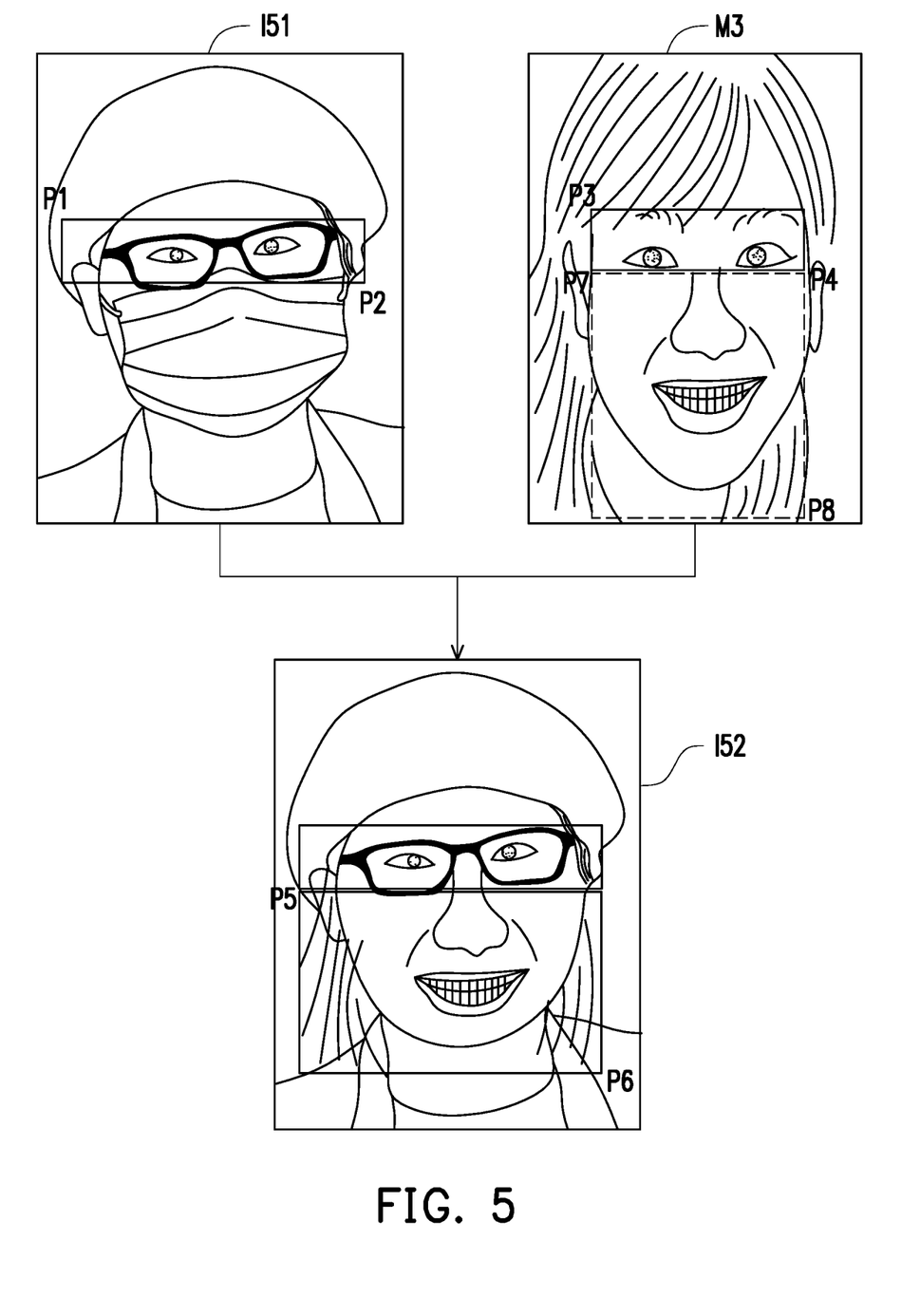
FIG. 5 is a functional flowchart of a process of generating a restored image shown according to an exemplary embodiment of the disclosure.

It should be noted that the process of generating the restored image I42 may be implemented by the steps of translation and zooming. FIG. 5 is a functional block diagram of a process of generating a restored image shown according to an exemplary embodiment of the disclosure.

Referring to FIG. 1 and FIG. 5 at the same time, the processor 124 obtains coordinates P1 (x1, y1) and P2 (x2, y2) of the bounding box of the eye region from a human facial image I51. The processor 124 filters out the simulation model M3 (resolution W×H) corresponding to the human facial image I51 from the simulation model database, and coordinates P3 (x3, y3) and P4 (x4, y4) of the bounding box of the eye region are obtained from the simulation model M3. The processor 124 restores the obscured human facial region of the human facial image I51 according to coordinates P7 (x7, y7) and P8 (x8, y8) of the simulation restore region of the simulation model M3 to generate coordinates P5 (x5, y5) and P6 (x6, y6) of the feature restore region in the restored image I52. Here, each coordinate value needs to satisfy the following relationship:

$$x5=x1,\ x6=x2,\ x7=x3,\ x8=x4$$

$$y5=y2,\ y7=y4$$

$$y8=H$$

from the ratio relationship, it may be seen that:

$$\frac{(y6-y5)}{(y2-y1)} = \frac{(y8-y7)}{(y4-y3)}$$

therefore:

$$y6 = y5 + \frac{(y2-y1)\times(y8-y7)}{(y4-y3)} = y2 + \frac{(y2-y1)\times(H-y4)}{(y4-y3)}$$

that is, the following relationship of translation and/or zoom is obtained:

$$y6 = \frac{(y2-y1)\times H - y1\times y4 - y2\times y3}{y4-y3}$$

It should be noted that the head orientation angle includes head rotation direction and head rotation angle. In an exemplary embodiment, the processor 124 determines that the head orientation angle of the human facial image I51 may be calculated according to the bounding box of the eye region. The processor 124 may calculate the turning index according to the grayscale distribution of the bounding box of the eye region, so as to determine whether the head of the user is faced left or right. When the head is faced left, the distance of the right eye thereof relative to the human face boundary (such as the temple) is shorter, and the distance of the left eye thereof is not changed significantly. This slight difference may be calculated by a weighting mechanism and used as the determination of head orientation. Moreover, the processor 124 estimates the head rotation angle of the user according to the aspect ratio of the bounding box of the eye region, wherein the head rotation angle and the aspect ratio of the bounding box of the eye region may be, for example, the following relationship:

Head rotation angle=reference angle ratio×(aspect ratio−aspect ratio when faced front)$^{power}$ When faced front, the aspect ratio of the bounding box of the eye region thereof is smaller, and the head angle is 0 degrees. When faced sideways, as the head angle is increased, the aspect ratio of the bounding box of the eye region is also increased. Therefore, in an exemplary embodiment, the parameters may be set as follows:

250 degrees<reference angle ratio<300 degrees, preferably 270 degrees;
0.3<aspect ratio of front face<0.35, preferably 0.333;
0.8<power<1.2, preferably 1.0.

In another exemplary embodiment, the processor 124 estimates the head rotation angle of the user according to the mask (or other obscuring objects) on the obscured human facial region of the human facial image I51. For example, the processor 124 may estimate the head rotation angle via the contour of the mask and the distribution of the shadow region of the mask. The processor 124 may also determine the nose bridge position via the connectivity characteristics of the bright region of the mask, so as to estimate the head rotation angle.

Please return to FIG. 3, the processor 124 performs full facial feature detection, so as to detect eye feature anchor points. Then, the processor 124 may perform regional grouping (for example, a black of the eye region, a white of the eye region, skin region) using a grouping algorithm (step S312), and calculate the eyeball center from the eyeball position after grouping (step S314). The grouping algorithm used in the present embodiment first converts an image from the RGB color space to the HSV color space, and then converts the HSV color space to the cone space to generate an image of a custom HSV color space (hereinafter referred to as HSV+), and then performs the grouping algorithm.

The conversion method between the RGB color space and the HSV color space adopted in the present exemplary embodiment is as follows:

$$h = \begin{cases} 0° & \text{if max = min} \\ 60°\times\frac{g-b}{\max-\min}+0° & \text{if max = r and } g \geq b \\ 60°\times\frac{g-b}{\max-\min}+360° & \text{if max = r and } g < b \\ 60°\times\frac{b-r}{\max-\min}+120° & \text{if max = g} \\ 60°\times\frac{r-g}{\max-\min}+240° & \text{if max = b} \end{cases}$$

$$s = \begin{cases} 0 & \text{if max = 0} \\ \frac{\max-\min}{\max} = 1-\frac{\min}{\max} & \text{otherwise} \end{cases}$$

$$v = \max$$

The conversion method between the HSV color space and the HSV+ color space is as follows:

$$x = s\times\cos h$$

$$y = s\times\sin h$$

$$z = \frac{v}{255}$$

wherein (r, g, b) are the red, green, and blue coordinates of one color of the RGB color space, and the values thereof are between 0 and 1. max and min are the largest and smallest in r and g, b, respectively. h∈ [0,360°) is the hue angle of the angle, and s, v∈[0,1] are the saturation and brightness respectively. (x, y, z) are the coordinates of the HSV+ color space respectively.

In the present exemplary embodiment, after the conversion between the RGB color space and the HSV+ color space, the data of the eye region may be grouped according to a K-means grouping algorithm to generate the black of the eye region, the white of the eye region, and the skin region, thereby calculating the coordinate position of the eyeball center from the black of the eye region. In terms of the locating precision of the eyeball center, compared with the RGB color space having an error of 12 to 13 pixels, a YUV color space having an error of 12 to 13 pixels, a Lab color space having an error of 10 to 11 pixels, and the HSV color space having an error of 13 to 14 pixels, the HSV+ color space used in the present exemplary embodiment has an error of 4 to 5 pixels, which in addition to effectively grouping the eye region captured in bright or dim fields, may also support close-range applications of 15 cm to 30 cm.

Figure 6:
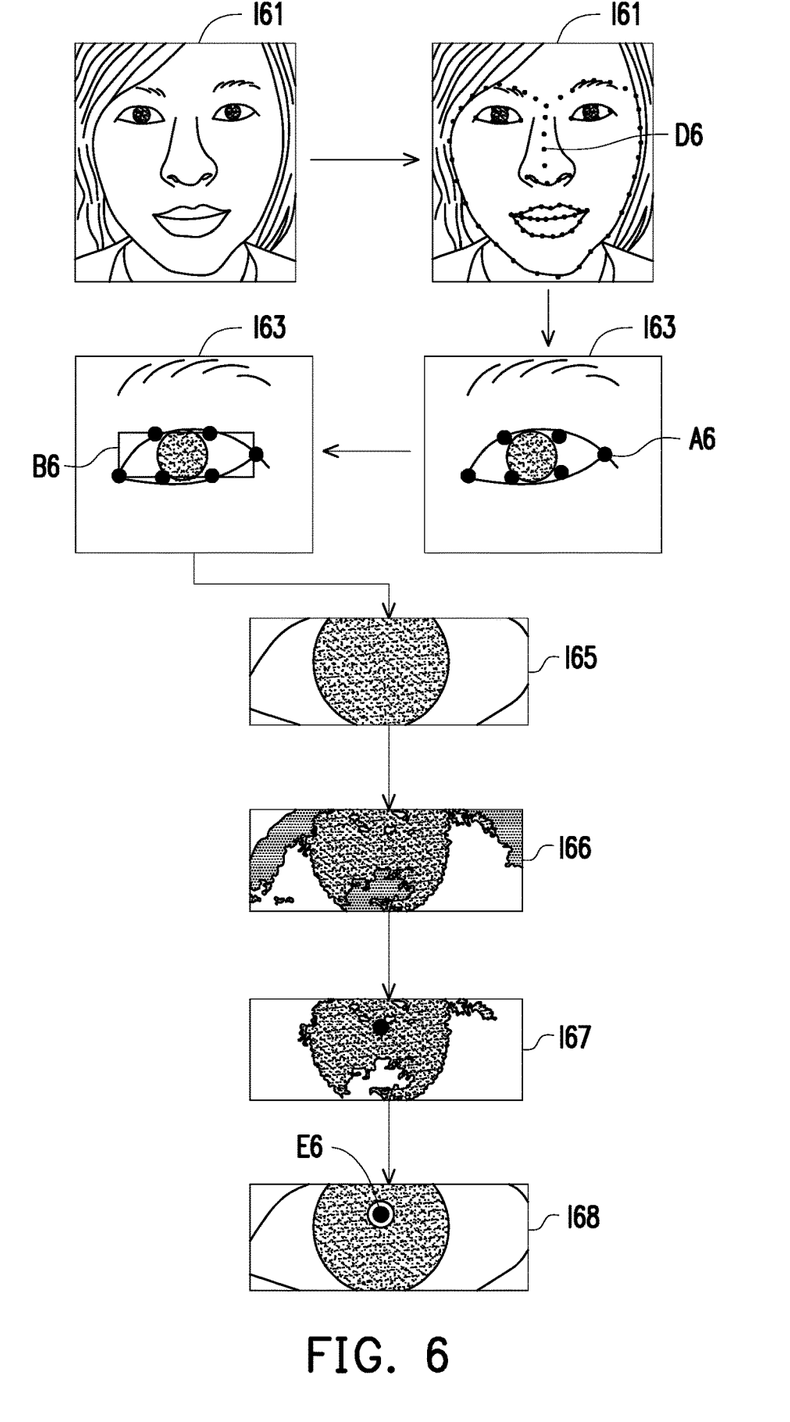
FIG. 6 is a functional flowchart of eyeball locating of a restored image shown according to an exemplary embodiment of the disclosure.

FIG. 6 is a functional flowchart of eyeball locating of a restored image shown according to an exemplary embodiment of the disclosure. The process of FIG. 6 may be regarded as the subsequent steps of FIG. 5.

Please refer to FIG. 1 and FIG. 6 at the same time. In the present exemplary embodiment, the processor 124 detects a facial feature anchor point after obtaining a restored image I61 to generate a detection result D6 of the facial feature anchor point, and an image I63 of an eye feature anchor point A6 is captured therefrom, so as to define the minimum external box B6 by the image I63 of the eye feature anchor point A6. Then, the processor 124 captures an image I65 of the smallest external box, and performs HSV+ color space conversion to generate an image I66 of the smallest external box of HSV+ color space, so as to perform grouping including a black of the eye region, a white of the eye region, and a skin region. The processor 124 filters out an image I67 of the dark region of the eye to calculate the eyeball center coordinates, thereby obtaining the coordinates of the eyeball center E6 of an image I68 of the eye region as the locating result. It should be mentioned that, assuming that the size of the minimum external box B6 is W×H, the minimum external box B6 may be replaced by an external box having a size between W×H and (W+2H)×(3H), and the disclosure is not limited in this regard.

Figure 7:
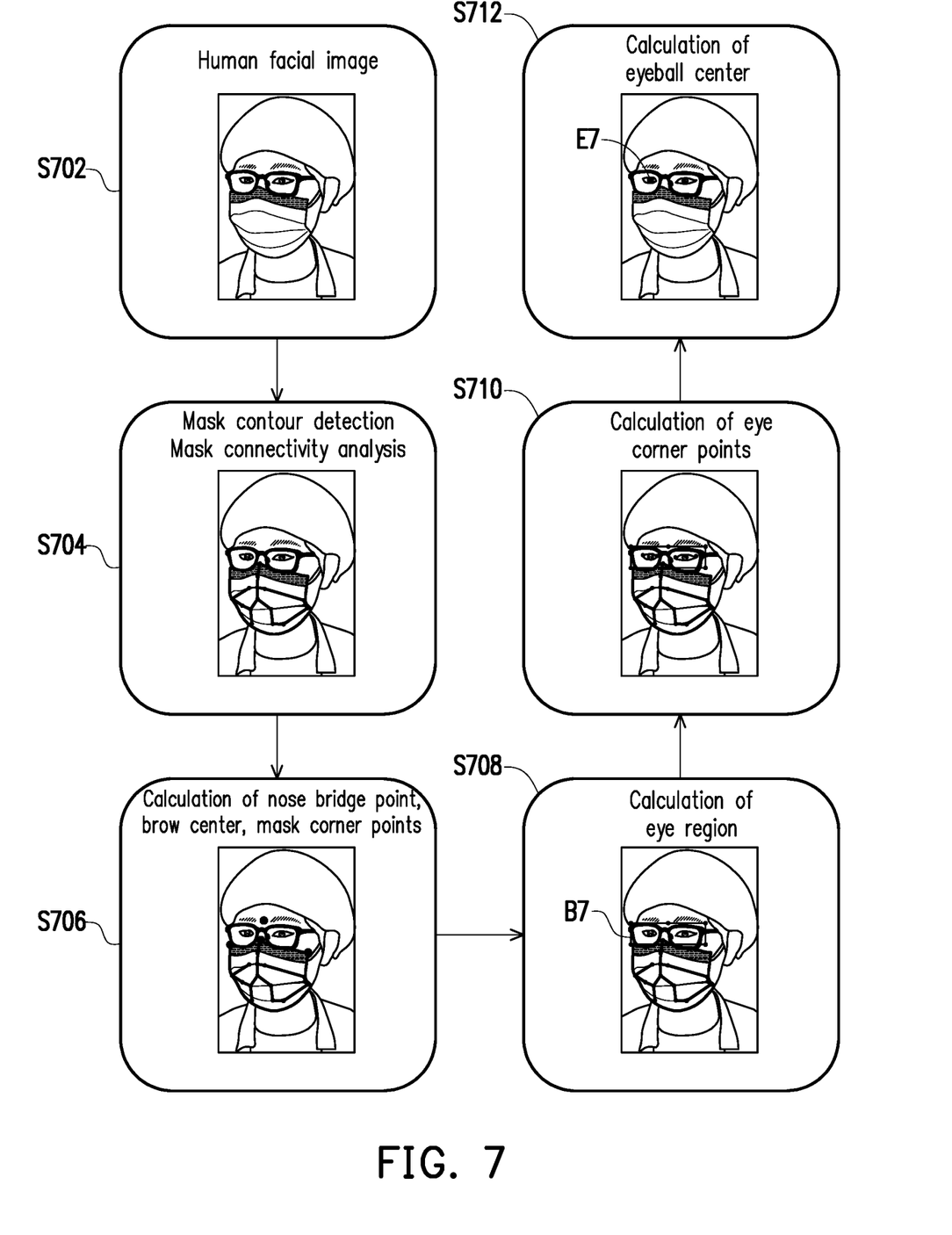
FIG. 7 is a functional flowchart of an eyeball locating method shown according to another exemplary embodiment of the disclosure.

FIG. 7 is a functional flowchart of an eyeball locating method shown according to another exemplary embodiment of the disclosure. In the present exemplary embodiment, the feature restoration of the obscured human facial region may be replaced via the mask contour and the analysis of the connectivity characteristics to directly calculate the eyeball center.

Please refer to FIG. 1 and FIG. 7 at the same time. In the present exemplary embodiment, the processor 124 obtains a human facial image I7 (step S702), and performs mask contour detection and mask connectivity analysis (step S704). The processor 124 may first obtain the contour of the mask via mask contour analysis, and then obtain a plurality of corner points of the mask, and then analyze the connectivity characteristics of the obscured human facial region to estimate the obscured human facial feature. For example, the processor 124 may calculate the position of the nose bridge via the connectivity characteristics of the bright region outside the mask, and then calculate the position of the eyebrow center. After the processor 124 calculates the nose bridge point, the eyebrow center, and the corner points of the mask (step S706), an eye region B7 may be calculated (step S708). Here, the processor 124 may calculate the coordinates of the contour position from the corner points of the mask at two sides extended vertically upward based on the height of the eyebrow center position, and then calculate the eye region B7 from the corner points. Next, the processor 124 processes the eye region B7 to calculate the eye corner points (step S710), thereby calculating an eye center E7 (step S712).

In an exemplary embodiment, the eye locating method may be implemented in a medical field having a transparent display, for example, and even if the surgeon is wearing a mask, the surgeon may still render the information needed during the surgical operation on the transparent display according to the surgeon's sight. In an exemplary embodiment, the eye locating method may also be implemented, for example, in a retail field or a display field having a transparent display, and may present product information or a guide introduction on the transparent display according to the line of sight of the user to provide an immersive experience. However, the above scenarios are examples, and the disclosure is not limited in this regard.

The eyeball locating method and the image processing device and image processing system thereof provided in the exemplary embodiments of the disclosure may determine the eyeball location using the detected unobscured human facial feature and the estimated obscured human facial feature even when the face of the user is obscured by an obscuring object such as a mask, thereby calculating the eyeball center to achieve precise eyeball locating.

It will be apparent to those skilled in the art that various modifications and variations may be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An eyeball locating method, comprising:
   storing a trained face detection model and a program through a memory; and
   executing the program through a processor to:
   obtain a human facial image of a user captured by an image capture device, and perform a human facial feature detection on the human facial image using the trained face detection model, wherein the human facial image comprises an unobscured human facial region and an obscured human facial region, and the unobscured human facial region comprises an eye region;
   detect at least one unobscured human facial feature from the unobscured human facial region;
   obtain a plurality of object corner points of an obscuring object according to a contour of the obscuring object and a plurality of bright regions on the obscured human facial region;
   perform connectivity characteristics of the bright regions of the obscuring object to estimate the obscured human facial feature;
   locate an eye region according to the plurality of object corner points, the unobscured human facial feature and the obscured human facial feature; and
   group a plurality of pixels of the eye region using a grouping algorithm, generate a black of the eye region, a white of the eye region, and a skin region, calculate a coordinate position of an eyeball center from the black of the eye region to locate an eyeball position.

2. The method of claim 1, further comprising:
   establishing a simulation model database to store in the memory, wherein the simulation model database comprises a plurality of simulation models, and the simulation models are established based on a plurality of different human facial images of a plurality of different head orientation angles.

3. The method of claim 2, wherein the step of estimating the obscured human facial feature from the obscured human facial region comprises executing the program through a processor to:
    determine a head orientation angle of the user in the human facial image to filter out a corresponding first simulation model from the simulation models;
    restore the obscured human facial region using the first simulation model to generate a restored image; and
    estimate the obscured human facial feature from the restored image.

4. The method of claim 3, wherein the head orientation angle of the user in the human facial image comprises a head rotation direction, wherein the head rotation direction is determined based on a distance between an eyeball of the eye region and a human face boundary.

5. The method of claim 3, wherein the head orientation angle of the user in the human facial image comprises a head rotation angle, wherein the head rotation angle is determined based on an aspect ratio of the eye region.

6. The method of claim 5, wherein the head rotation angle is determined based on an aspect ratio of the eye region, a reference angle ratio, an aspect ratio of a front face, and a power in the human facial image, the reference angle ratio is between 250 degrees and 300 degrees, the aspect ratio of the front face is between 0.3 and 0.35, and the power is between 0.8 and 1.2.

7. The method of claim 3, wherein the head orientation angle of the user in the human facial image comprises a head rotation angle, and the head rotation angle is determined according to a contour of an obscuring object on the obscured human facial region.

8. The method of claim 3, wherein the head orientation angle of the user in the human facial image comprises a head rotation angle, and the head rotation angle is determined according to a distribution of a shadow region of an obscuring object on the obscured human facial region.

9. The method of claim 3, wherein the head orientation angle of the user in the human facial image comprises a head rotation angle, wherein the head rotation angle is determined according to a connectivity characteristic of an outer bright region of an obscuring object on the obscured human facial region.

10. The method of claim 3, wherein the step of restoring the obscured human facial region using the first simulation model to generate the restored image comprises executing the program through a processor to:
    capture a simulation restore region corresponding to the obscured human facial region from the first simulation model;
    generate the restored image according to the unobscured human facial region and the simulation restore region.

11. The method of claim 10, wherein the step of generating the restored image according to the unobscured human facial region and the simulation restore region comprises executing the program through a processor to:
    perform a translation processing and/or a zoom processing on the simulation restore region to generate a feature restore region; and
    generate the restored image using the unobscured human facial region and the feature restore region.

12. The method of claim 1, wherein before the pixels of the eye region are grouped, the method further comprises executing the program through a processor to:
    converting the pixels to a custom HSV color space, wherein the custom HSV color space is converted from an HSV color space to a cone space.

13. The method of claim 12, wherein the step of grouping the pixels of the eye region comprises executing the program through a processor to:
    grouping the pixels converted to the custom HSV color space to generate the black of the eye region, the white of the eye region, and the skin region.

14. The method of claim 12, wherein the step of locating the eyeball position comprises executing the program through a processor to:
    calculating a center position of the black of the eye region as a locating result of the eyeball position.

15. The method of claim 1, wherein the step of locating the eyeball position from the eye region according to the unobstructed human facial feature and the obscured human facial feature comprises executing the program through a processor to:
    defining the eye region according to the corner points, the unobscured human facial feature, and the obscured human facial feature, so as to locate the eyeball position.

16. The method of claim 1, wherein the step of locating the eyeball position comprises executing the program through a processor to:
    calculating a plurality of eye corner points of the eye region; and
    calculating the eyeball position based on the eye corner points.

17. An image processing device, comprising:
    a memory configured to store a trained face detection model; and
    a processor connected to the memory and configured to:
    obtain a human facial image of a user captured by an image capture device, and perform a human facial feature detection on the human facial image using the trained face detection model, wherein the human facial image comprises an unobscured human facial region and an obscured human facial region, and the unobscured human facial region comprises an eye region;
    detect at least one unobscured human facial feature from the unobscured human facial region;
    obtain a plurality of object corner points of an obscuring object according to a contour of the obscuring object and a plurality of bright regions on the obscured human facial region;
    perform connectivity characteristics of the bright regions of the obscuring object to estimate the obscured human facial feature;
    locate an eye region according to the plurality of object corner points, the unobstructed human facial feature and the obstructed human facial feature; and
    group a plurality of pixels of the eye region using a grouping algorithm, generate a black of the eye region, a white of the eye region, and a skin region, calculate a coordinate position of an eyeball center from the black of the eye region to locate an eyeball position.

18. An image processing system, comprising:
    an image capture device configured to capture a human facial image of a user, wherein the human facial image comprises an unobscured human facial region and an obscured human facial region, and the unobscured human facial region comprises an eye region;

an image processing device connected to the image capture device and configured to:
store a trained face detection model;
obtain the human facial image from the image capture device;
perform a human facial feature detection on the human facial image using the trained face detection model;
detect at least one unobscured human facial feature from the unobscured human facial region;
obtain a plurality of object corner points of an obscuring object according to a contour of the obscuring object and a plurality of bright regions on the obscured human facial region;
perform connectivity characteristics of the bright regions of the obscuring object to estimate the obscured human facial feature;
locate an eye region according to the plurality of object corner points, the unobstructed human facial feature and the obstructed human facial feature; and
group a plurality of pixels of the eye region using a grouping algorithm, generate a black of the eye region, a white of the eye region, and a skin region, calculate a coordinate position of an eyeball center from the black of the eye region to locate an eyeball position.

* * * * *